United States Patent [19]

Lehto

[11] Patent Number: 4,492,121
[45] Date of Patent: Jan. 8, 1985

[54] GAUGE FOR MEASURING HIGH TRANSIENT PRESSURES

[75] Inventor: Delbert L. Lehto, Silver Spring, Md.

[73] Assignee: The United States of America as represented by the Secretary of the Navy, Washington, D.C.

[21] Appl. No.: 429,692

[22] Filed: Sep. 30, 1982

[51] Int. Cl.³ .............. G01L 23/08; G01N 33/22; G01N 21/64

[52] U.S. Cl. ..................... 73/705; 73/35; 250/227

[58] Field of Search .......... 73/705, 35; 250/227, 250/231 R, 231 P; 356/44

[56] References Cited

U.S. PATENT DOCUMENTS

| | | | |
|---|---|---|---|
| 2,519,421 | 8/1950 | Weiss | 73/35 |
| 3,831,137 | 8/1974 | Cuomo | 250/227 X |
| 3,885,879 | 5/1975 | Louder et al. | 250/227 X |
| 4,075,493 | 2/1978 | Wickersheim | |
| 4,136,566 | 1/1979 | Christensen | 250/227 X |
| 4,162,397 | 7/1979 | Bucaro et al. | 358/901 X |
| 4,215,275 | 7/1980 | Wickersheim | 128/736 X |
| 4,262,198 | 4/1981 | Gupta et al. | 250/227 X |
| 4,278,349 | 7/1981 | Sander | 356/44 |
| 4,288,159 | 9/1981 | Newman | 356/44 |
| 4,295,739 | 10/1981 | Meltz et al. | 356/44 X |
| 4,355,910 | 10/1982 | Quick et al. | 73/705 X |

FOREIGN PATENT DOCUMENTS

60239  4/1982  Japan ........................ 73/705

OTHER PUBLICATIONS

"Pressure Measurement Made by the Utilization of Ruby Sharp-Line Luminescence", *Science*, vol. 176, Jan. 1972, Richard A. Forman et al., 2 pp.

"An Optical Fluorescence System for Quantitative Pressure Measurement in the Diamond-Anvil Cell", *Journal of Applied Physics*, vol. 44, No. 1, Jan. 1973, J. D. Barnett et al., pp. 1-9.

"Calibration of the Pressure Dependence of the $R_1$ Ruby Fluorescence Line to 195 KBar", *Journal of Applied Physics*, vol. 46, No. 6, Jun. 1975, G. J. Piermarini et al., pp. 2774-2780.

"The Diamond Cell Stimulates High-Pressure Research", *Physics Today*, Sep. 1976, Stanley Block et al., pp. 44-55.

"Spectroscopy at Very High Pressures: Part X, Use of Ruby R-Lines in the Estimation of Pressure at Ambient and at Low Temperatures", *Journal of Physics E: Scientific Instruments*, vol. 9, 1976, pp. 1140-1144, D. M. Adams et al.

"Fiber-Optic Coupled Pressure Transducer", *ISA Transactions*, vol. 19, No. 2, 1980, C. R. Tallman et al., pp. 49-53.

"Moving Fiber-Optic Hydrophone", *Optics Letters*, vol. 5, No. 1, Jan. 1980, W. B. Spillman, Jr. et al., pp. 28-31.

"Growth of Single-Crystal Sapphire-Clad Ruby Fibers", pp. 383-384, *Applied Physics Letters*, vol. 31, No. 6, 9-1977, C. A. Burrus et al.

*Primary Examiner*—Gerald Goldberg
*Assistant Examiner*—Tom Noland
*Attorney, Agent, or Firm*—Robert F. Beers; Kenneth E. Walden

[57] ABSTRACT

An article and method is provided for remotely optically measuring high transient isotropic pressures. The arrangement employs a fluorescent crystal (such as a ruby) secured to one end of an elongate optical fiber waveguide for placement in the vicinity of a high pressure occurrence such as near an explosion. Light launched into the free end of the waveguide travels the length thereof to stimulate the crystal, which in the case of a ruby, fluoresces in the red, the wave length of which varies in response to isotropic pressure on the ruby. This red light output is transported back along the same optical fiber waveguide to the free end where its wavelength change is monitored and translated into a pressure value on the crystal.

11 Claims, 16 Drawing Figures

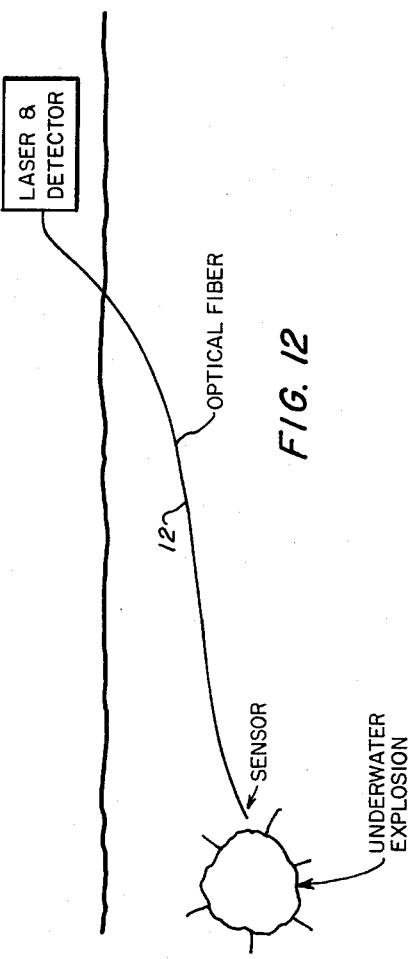
FIG. 9
FIG. 10
FIG. 11
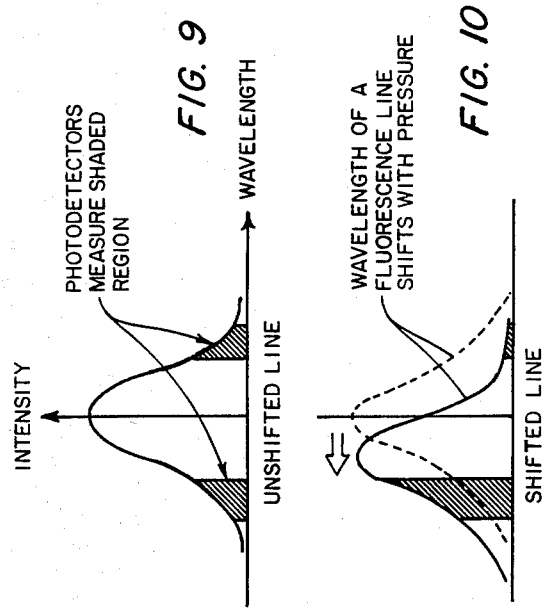
FIG. 12

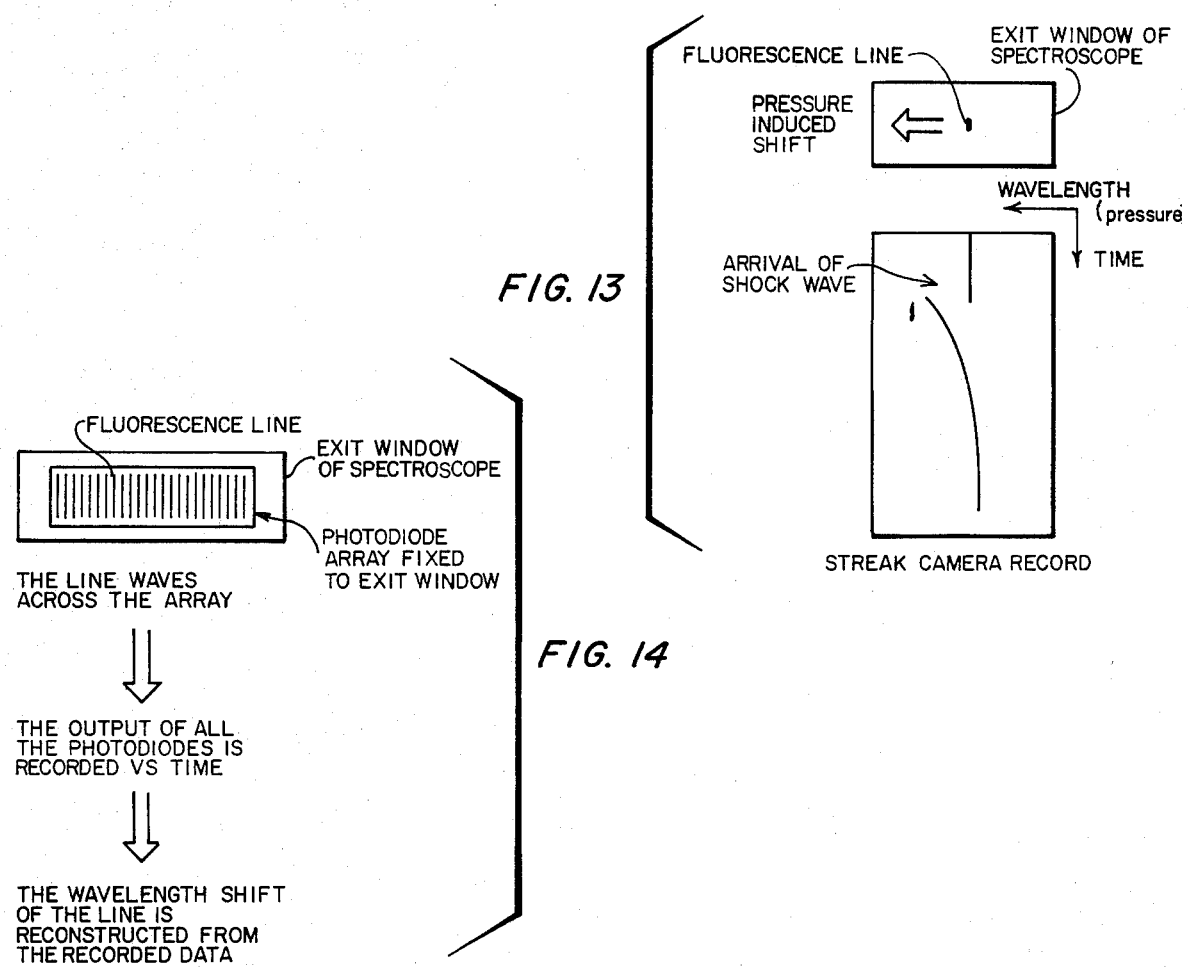
FIG. 13
FIG. 14
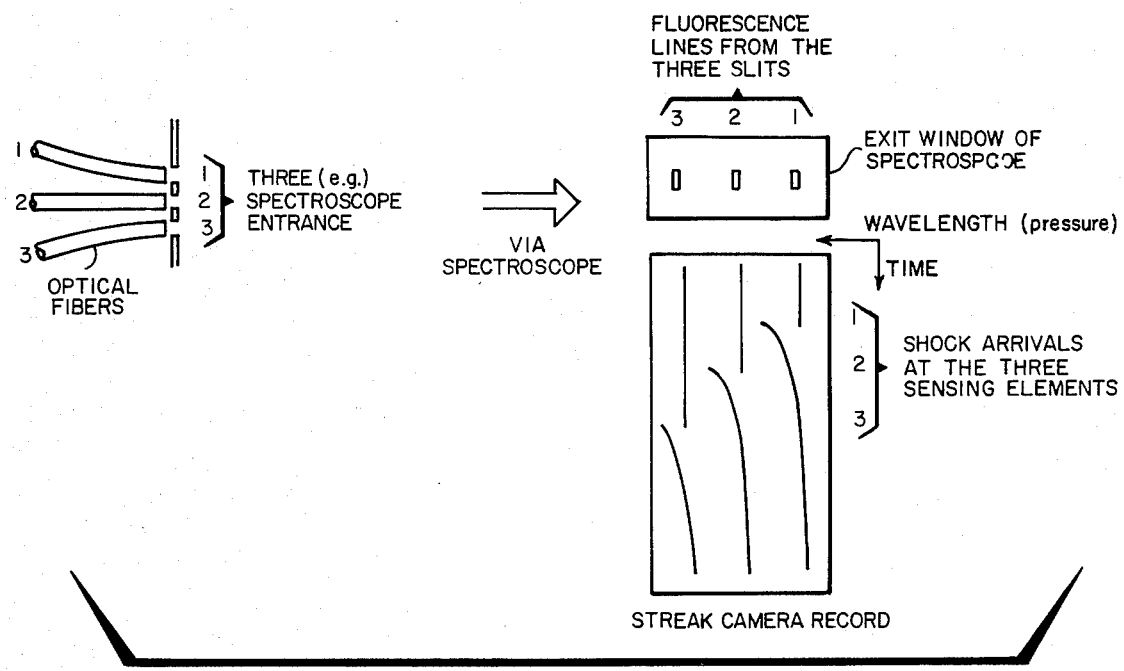
FIG. 15

GAUGE FOR MEASURING HIGH TRANSIENT PRESSURES

BACKGROUND OF THE INVENTION

This invention relates to an apparatus and method for measuring high transient isotropic pressure in the vicinity of an underwater explosion.

There are many devices currently used for obtaining pressure measurements. Pressure gauges generally fall into three broad categories based on principles of operation: (1) liquid column, (2) expansible-element gauges and (3) electrical pressure transducers. Generally, only the latter is adapted for measuring high transient pressures such as exist near an explosion. While there are several types within the pressure transducer family used for this purpose, one of the more common types is the piezoelectric pressure transducer. This type employs crystals which, when arranged in particular orientation and subjected to pressure, produce an electrical potential.

Blast pressures emanating from explosions are presently measured by piezoelectric gauges connected by coaxial cables to a recorder. This method, while in accepted use today, has several disadvantages. The piezoelectric crystals break at above about 200 megapascals (2 kbar or approximately 32,000 psi), far below the pressure at the surface of an explosive charge (about 150 kbar) The coaxial cables connected with the piezoelectric gauges generate noise when the explosion shock wave passes over them, and this detracts from true readings. Furthermore, most of the gauges in present use today are too large for measuring small explosions in tanks under laboratory conditions. The use of slowly responding types of pressure measuring devices such as liquid columns are, of course, totally out of consideration for measuring explosive pressures.

There is a present need for simple and inexpensive arrangements for measuring the high transient pressures in the vicinity of an explosion.

It has been known for sometime that the wavelength of the fluorescent radiation given off by some crystals (e.g., ruby) is dependent on pressure on the crystal. For example, the $R_1$ red line of ruby shifts 0.365 Å/kbar in reponse to pressure on the ruby. (1 bar equals approximately 1 atmosphere pressure). This method, for example, has become the standard method for measuring pressure inside a diamond anvil high-pressure cell. A ruby chip within the cell is irradiated by focused blue laser light and the fluorescent light (red) given off by the ruby is fed into a spectroscope for wavelength shift measurement. This method is illustrated in FIG. 3 of the drawings of this application for background purposes and will be more fully described herein after.

This principle is discussed in articles entitled "Pressure Measurement Made by the Utilization of Ruby Sharp-Line Luminescence", Science, Vol. 176, Jan. 1972; "An Optical Fluorescent System for Quantitative Pressure Measurement in the Diamond-Anvil Cell", Journal of Applied Physics, Vol. 44, 1973; "Calibration of the Pressure Dependence of the $R_1$ Ruby Fluorescent Line to 195 kbar", Journal of Applied Physics, Vol. 46, No. 6, June 1975; and "The Diamond Cell Stimulates High-Pressure Research", Physics Today, Sept. 1976.

The article (third article above) regarding spectroscopy at very high pressures gives the wavelength shift of the ruby $R_1$ and $R_2$ lines under hydrostatic pressures up to 200 kbar, as illustrated in FIG. 1 of the drawings herein. Isotropic pressure loading shifts the lines without changing their shapes, as shown in FIG. 2 of the drawings herein. Under non-isotropic conditions the line shapes are distorted as illustrated in FIG. 2a of the drawings herein.

There is discussed in the prior art methods of measuring temperature change. There is disclosed in U.S. Pat. Nos. 4,075,493 and 4,215,275 a method employing a length of optical fiber with a layer of phosphor material at one end of the optical fiber to be placed as a temperature probe at a heat source. The phosphor is illuminated by ultraviolet light to excite the phosphor to emit light which is conducted through the optical fiber to detection near or at the free end thereof. The relative intensity of two distinct wavelength radiation bands is an indication of the temperature of the phospher layer, and hence that of the surrounding environment.

An optical temperature transducer is disclosed in U.S. Pat. No. 4,288,159, and an optical temperature sensor is disclosed in U.S. Pat. No. 4,278,349 illustrating the ability of certain materials to change color in response to temperature change. Light of two different wavelengths is transported to the material via two optical fibers and transported back through another optical fiber to detectors for determining the change in absorption of the material.

The use of optical fiber waveguides for transporting light, including laser light, over long distances is rapidly developing in the art due in large part to low loss fibers now available on the market. The use of optical fibers in interferometric arrangements for detecting acoustic pressure changes in a liquid medium (e.g. water) is known. For example, see U.S. Pat. No. 4,162,397 issued July 24, 1979 to Joseph A. Bucaro et al, wherein light travels along two equal length paths, one of which is exposed to an acoustic pressure wave while the other is isolated therefrom. The optical fiber exposed to the pressure wave has introduced therein a phase shift of light passing therethrough which can be detected relative to that of light having pass through the isolated path which is not subjected by the pressure wave.

There are numerous methods known for detecting changes in temperature and transient pressure. The present system employs an arrangement not taught or suggested in the prior art, and it is inexpensive, rugged and ideally adapted to measure, without destruction, extremely high transient pressures such as those near an underwater explosion, not heretofore possible with piezoelectric-type transient pressure measuring devices.

SUMMARY OF THE INVENTION

The present invention teaches the use of an elongate optical fiber waveguide having at one end a fluorescent crystal (such as a ruby) adapted to be disposed in the vicinity of a high pressure wave, such as that of an underwater explosion, for detecting the transient pressures thereof. The other end (the free end) of the elongate optical fiber waveguide, which for practical purposes is located a considerable distance from the crystal end in order to protect delicate equipment from blast pressures has light, such as blue laser light, launched thereinto. This light is transported along the optical fiber waveguide to the crystal for causing it to fluoresce at a wavelength (red if ruby) which varies in response to hydrostatic pressure on the crystal. This output light is transported back along the same optical fiber waveguide to the free end where the wavelength change is processed through a spectroscope for pressure determination.

The output from the crystal may be enhanced by providing a reflective surface on the back side of the ruby whereby stimulating light entering the ruby is, in effect, reflected back through the ruby for a second pass. This, along with reflection back of fluorescence emitted in directions where it would otherwise not enter the fiber, increases the output efficiency of the crystal.

It is, therefore, an object of the invention to provide a transient pressure gauge for measuring high pressures.

Another object of the invention is to provide a transient pressure gauge particularly adaptable for measuring high isotropic pressures emanating from underwater explosions.

Still another object of the invention is to provide a high transient isotropic pressure gauge employing a fluorescent crystal (e.g. ruby) disposed at the end of an elongate optical fiber for receiving stimulating light therefrom for causing emission of red light, the wavelength of which is responsive to pressure on the crystal.

Yet still another object of the invention is to provide a transient isotropic pressure gauge for use in water employing a ruby at one end of an elongate optical fiber waveguide covered by a reflective surface on its backside, whereby light launched into the other end of the optical fiber is transported to the ruby and reflected back through the ruby for doubly stimulating it to emit electromagnetic radiation in the red, the exact wavelength of which is responsive to hydrostatic pressure on the crystal.

Additional objects, advantages, and features of the invention as set forth hereinafter will become apparent when considered in conjunction with the accompanying drawings.

BRIEF DESCRIPTION OF THE DRAWINGS

FIG. 9 illustrates a wavelength of the fluorescent light from the ruby and location of space photodetectors.

FIG. 10 illustrates a shift in the wavelength shown in FIG. 9 relative to the location of the photodetectors.

FIG. 11 illustrates the location of photodetectors to measure output ratios as shifted in FIG. 10 in respect to pressure changes.

FIG. 12 illustrates application of the sensor in the area of an underwater explosion with the input laser and detector located a considerable distance from the explosion.

FIG. 13 illustrates photographing the spectrum with a highspeed streak camera.

FIG. 14 illustrates focusing of the spectrum on a photodiode array.

FIG. 15 illustrates plural optical fibers connected to a single spectroscope.

DETAILED DESCRIPTION OF THE PREFERRED EMBODIMENTS

Figure 1:
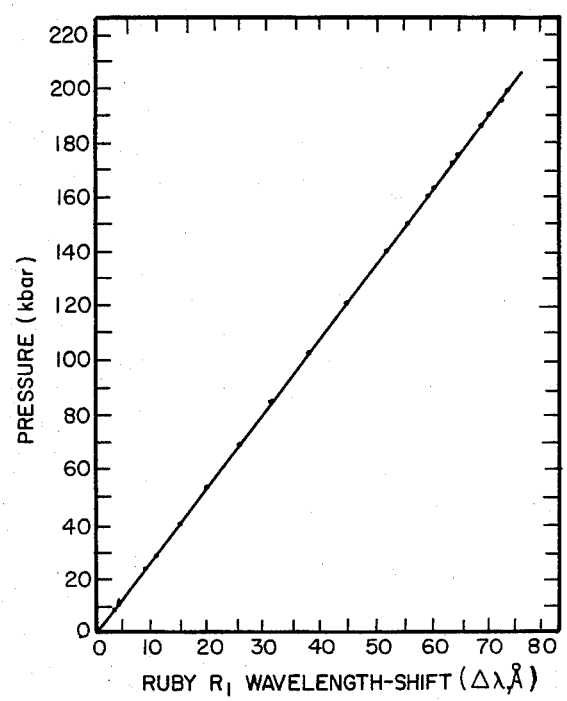
FIG. 1 is a graphical representation of wavelength shift for ruby fluorescence versus pressure (kbar) on the ruby.
Figure 2:
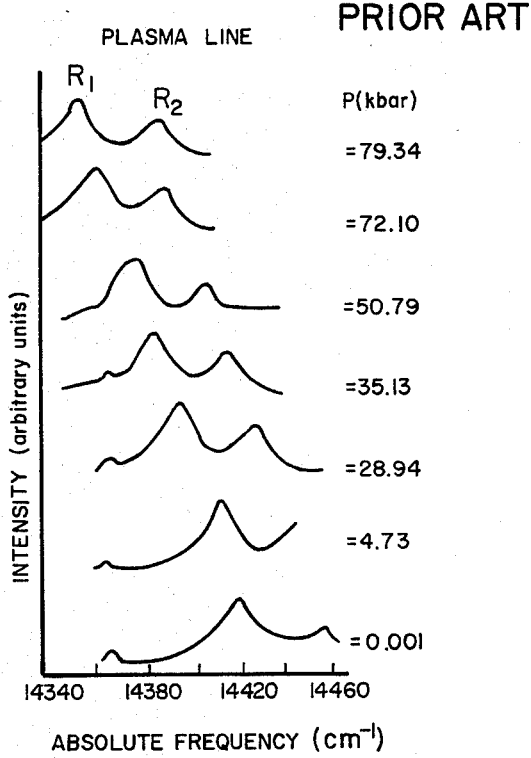
FIG. 2 is another graphical representation illustrating wavelength shift without shape distortion of ruby $R_1$ and $R_2$ fluorescent lines versus isotropic pressure (kbar) on a ruby.
Figure 2A:
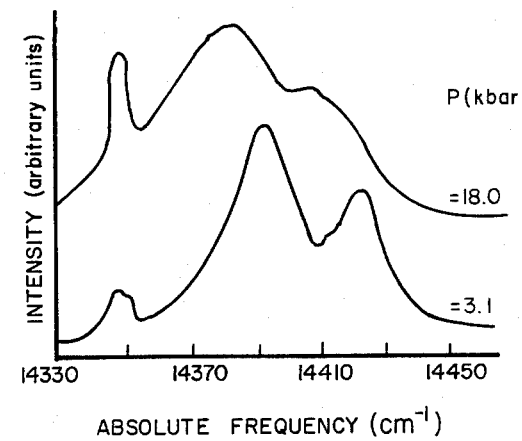
FIG. 2A is a graphical representation related to FIG. 2 illustrating wavelength shift with some shape distortion of ruby $R_1$ and $R_2$ fluoresce lines from a sample under non-isotropic pressure.

Referring first to the drawings there is illustrated by a graph in FIG. 1 representation of experimental data indicating a generally straight line relationship of ruby fluorescent wavelength shift ($\Delta\lambda$ in Å) versus hydrostatic pressure (kbar). This data is reported in the article "Calibration of the Pressure Dependence of the $R_1$ Ruby Fluorescence Line to 195 kbar", Journal of Applied Physics, Vol. 46, No. 6, June 1975. FIGS. 2 and 2A are based on information reported in "Spectroscopy at Very High Pressures", Journal of Physics E: Scientific Instruments, 1976, Vol. 9, and illustrates, respectively, (1) the behavior of $R_1$ and $R_2$ lines under hydrostatic (isotropic) conditions on the ruby wherein both lines are shifted without shape distortion by the same amount toward a lower wavelength as pressure (kbar) is increased, and (2) the effect of non-isotropic pressure on the ruby $R_1$ and $R_2$ lines at increased pressure. If pressure on the crystal is omnidirectional or isotropic, then there is a shift as illustrated in FIG. 2. If the pressure on the crystal is from one side more than from another side, there is a shift, but with distortion as illustrated in FIG. 2A. The lines simply do not maintain their shape from one pressure to the next under non-isotropic pressure.

Figure 3:
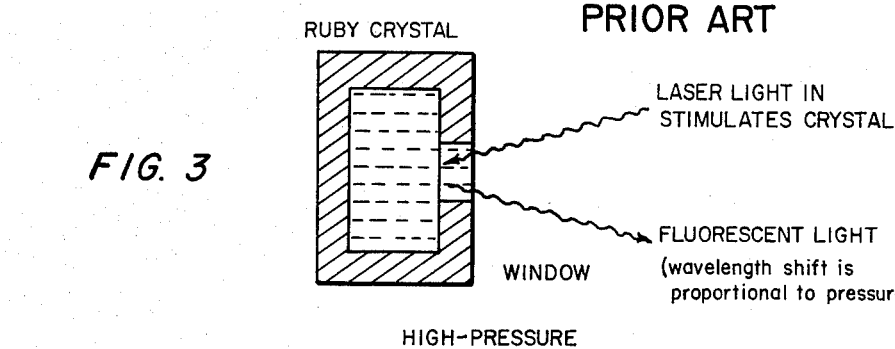
FIG. 3 is an arrangement illustrating present use of fluorescence to measure hydrostatic pressure inside a container.

There is illustrated in FIG. 3 a known method for measuring high hydrostatic pressure within a closed vessel. A ruby is disposed within a vessel adjacent a window through which laser light is passed to stimulate it. The resulting fluorescence (red) from the ruby passes back through the window but has its wavelength shifted slightly toward the lower wavelengths with an increase of hydrostatic pressure within the vessel.

Figure 4:
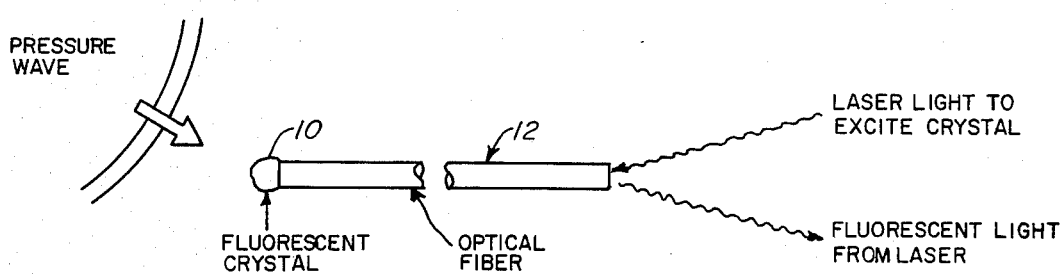
FIG. 4 illustrates the basic concept of the present invention.
Figure 4:
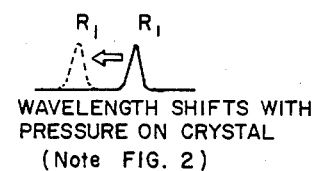

The principle of the present invention is illustrated generally in FIG. 4 where a fluorescent crystal 10, such as a ruby, is bonded to one end of elongate optical fiber 12, the length of which may extend up to two kilometers or more. Light from a source, such as a laser, is launched into the other end of the optical fiber and transported therethrough to the one end from which it passes into crystal 10. Light (preferably blue laser light) entering the crystal stimulates it and causes it to fluoresce (red if a ruby crystal). The fluorescence light is coupled back into the one end of fiber 12 and is transported to the other end where its wavelength is measured as a function of time for translation into an indication of pressure which acted on the fluorescent crystal. This arrangement has particular adaptability for use in measuring transient pressure waves which, when traveling, are relatively broad waves compared to a small crystal and establish an isotropic or hydrostatic pressure condition on the crystal.

Figure 5:
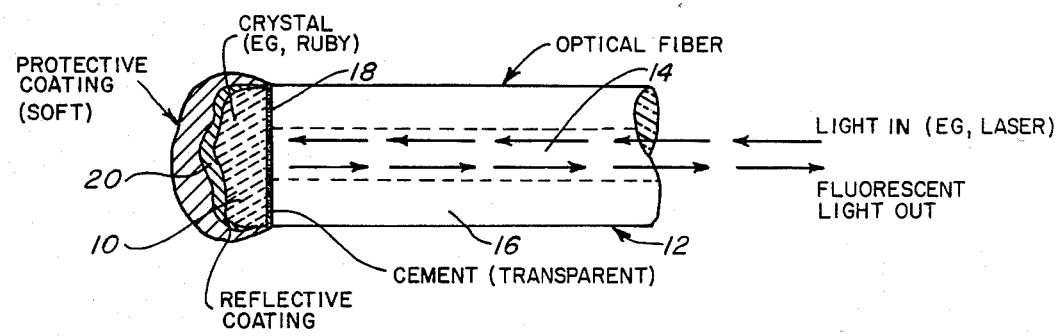
FIG. 5 is a more detailed description of the hydrostatic transient pressure sensing end of the optical fiber wave quide according to the present invention.

The one end of the optical fiber 12 to which a fluorescent crystal 10 is attached is illustrated in considerable more detail in FIG. 5. Optical fiber 12 includes a light transmitive core 14 surrounded by cladding 16 for retaining the light within the core. Fluorescent crystal 10 must be of a size just sufficient to about cover the end of optical fiber 12 with a relatively flat face facing the fiber which is secured thereto by a light transmitive cement 18. The back side of the crystal opposite the optical fiber end is preferably covered with a reflective coating 20, such as aluminum, for the purpose of reflecting fluorescent light as well as laser beam light back into the crystal for a second pass therethrough to cause an increased amount of fluoresce to enter the fiber. The entire exposed surface of crystal 10 and reflective coating 20 is preferably covered with a relatively soft coating, preferably adhere thereto, to provide physical protection. The coating protects the reflecting coating from corrosion and may also be used as thermal insulation to isolate shock heating of the ruby from shock heating of the surrounding medium (e.g., water).

Figure 6:
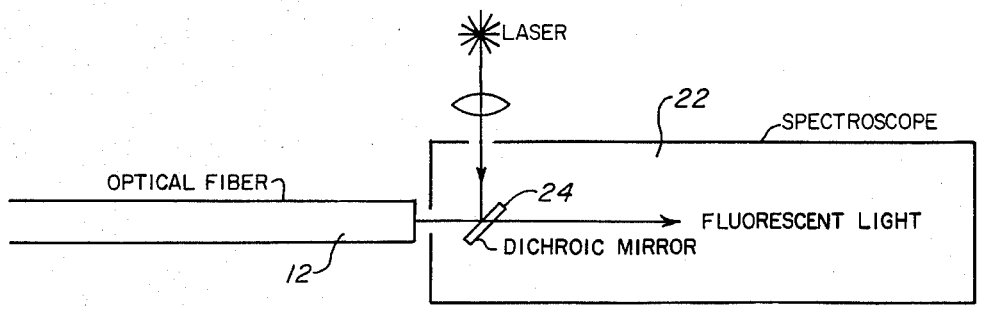
FIG. 6 illustrates one optical embodiment for launching laser light into the optical fiber and for measuring wavelength shift in returning fluorescence.
Figure 7:
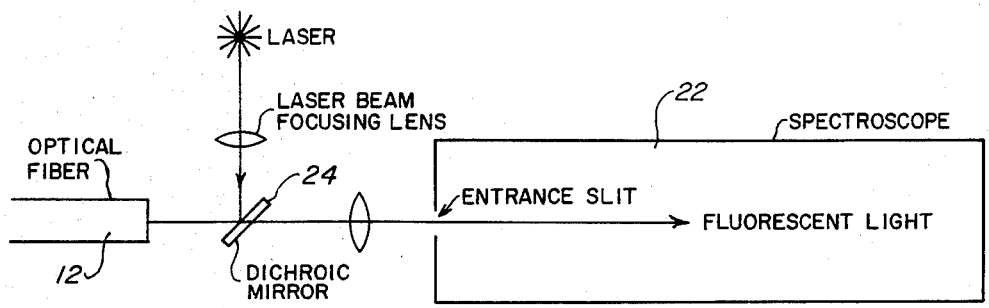
FIG. 7 illustrates another embodiment for launching laser light into the optical fiber and for measuring wavelength shift of returning fluorescent.

It will be apparent that a very small crystal will suffice as the core of the optical fiber itself is quite small, in the range of a few microns. There are illustrated in FIGS. 6 and 7 arrangements for launching laser light into the other end of optical fiber 10 and for receiving fluoresced light back therefrom. In the FIG. 6 embodiment, laser light is passed into a spectroscope 22 and onto a partially reflective mirror (preferably dichroic) 24 from which it is coupled into the optical fiber end to travel to the crystal (not illustrated) to cause it to fluoresce. Returning fluorescent light passes in part straight through mirror 24 into spectroscope 22 where it is processed in much the manner as illustrated in FIG. 8.

FIG. 7 differs from FIG. 6 only in that focusing and beam splitting of the light is accomplished outside spectroscope 22. Fluorescent light returned to the spectroscope is processed according to the illustration in FIG. 8.

The end of the optical fiber may be placed onto the spectroscope slit (FIG. 6), or lenses may be used between the fiber and slit (FIG. 7). In either case, laser light is focused onto the end of the fiber with a lens and a dichroic mirror which reflects the laser light but transmits the fluorescent light.

Figure 8:
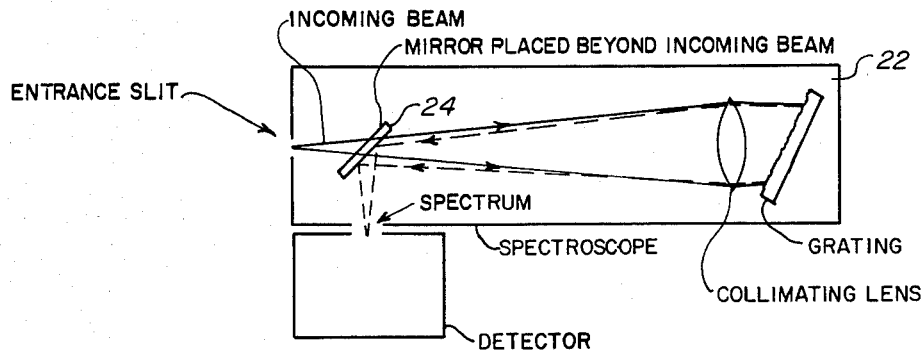
FIG. 8 illustrates the arrangement contained within the spectroscopes of FIG. 7.

A conventional grating spectroscope with mirror optics may be used; however, since only a small range of wavelengths is used and because no scanning of the spectrum (by turning the grating) is needed, the simple littrow mounting (used in astronomy) of FIG. 8 may be used. This is much less bulky than a mirror-optics spectroscope and gives better access to the rear of the slit for focusing, alignment, and for placement of parts such as a dichroic mirror and laserbeam focusing lens.

The spectrum revealed by the spectroscope illustrated in FIG. 8 consists of a short strip of light which moves back and forth in response to pressure on crystal 10. This movement is measured by (1) photographing the spectrum with a high-speed streak camera, as illustrated in FIG. 13, (2) focusing the spectrum on a photodiode array, as illustrated in FIG. 14, or, for small shifts resulting from low pressures of a few kilobars, a two element photodetector straddling the fluoresce line may be used. Their space arrangement is illustrated in FIG. 11 where they are adapted to read the intensities at the shaded areas of FIGS. 9 and 10. They measure the fluoresce light output in two regions of approximately equal intensity. As the wave is shifted to the left, as illustrated in FIG. 10, for example, the intensity output of the differences become apparent. The ratio of the photodetector outputs is related to the isotropic fluid pressure on the crystal. As the wavelength is shifted it can be seen that one of the detectors will be reading a substantially higher intensity while the other is reading a lower intensity. This scheme has the advantage of simplicity because only the ratio of the two detector outputs needs to be recorded. A single spectroscope can process information arriving through a plurality of optical fibers from respective sensors, as illustrated in FIG. 15.

FIG. 12 illustrates use of the invention arranged for measuring pressures at or near an explosion from a safe distance ranging up to 2 kilometers or beyond.

Fluorescent crystals are sensitive to temperature as well as pressure. With ruby, for example, a 1° C. temperature rise gives the same wavelength shift (change) as a 0.187 kbar (approximately 3000 psi) pressure rise. This effect is compensated for in the present invention by (1) thermally insulating the crystal or (2) allowing the crystal to respond to the temperature of the shocked water and subsequently removing the temperature effect from the total record.

Fluorescent emission from a ruby takes place a few milliseconds after absorption of the stimulating light but this delay is irrelevant to the measurement of changing pressures because it is the pressure on the ruby crystal at the moment of emission that determines the fluorescent wavelength.

There has been described the principle of an invention with respect to several background principles and presented in preferred embodiments. It will be obvious to those skilled in the art that various changes and modifications may be made herein without departing from the spirit of the invention which is limited only by the scope of the claims appended hereto.

I claim:

1. A method of remotely measuring high transient isotropic pressures in water comprising:
   providing an elongate optical fiber waveguide;
   securing a fluorescent crystal on one end of the optical fiber waveguide in optical communication therewith;
   disposing the one end of the optical fiber waveguide in water in the vicinity of an underwater explosion;
   launching light into the other end of the optical fiber waveguide for traveling to the one end for stimulating the crystal to fluoresce at a wavelength responsive to pressure on the crystal;
   transporting the crystal fluorescence back through the optical fiber waveguide to the other end; and,
   measuring the shift in fluorescent light wavelength resulting from isotropic pressure changes on the crystal.

2. The method according to claim 1 further defined by securing a ruby crystal on the end of the optical fiber waveguide.

3. The method according to claim 1 or 2 further defined by providing an optical reflector on a backside of the crystal remote from the optical fiber end for reflecting the fluorescence light and the stimulating light for a second pass through the crystal for increasing its fluorescent output.

4. The method according to claim 1 further defined by providing said elongate optical fiber waveguide with a length up to about two kilometers.

5. The method according to claim 1, 2 or 4 further defined by launching laser light into the other end of the optical fiber waveguide.

6. The method according to claim 5 further defined by stimulating the crystal with blue laser light.

7. The method according to claim 3 further defined by stimulating the crystal with blue laser light.

8. The method according to claim 5 further defined by measuring pressure induced wavelength change in light emanating from the other end of the optical fiber waveguide by a spectroscope.

9. The method according to claim 3 further defined by measuring pressure induced wavelength change in light emanating from the other end of the optical fiber waveguide by a spectroscope.

10. The method according to claim 5 further defined by measuring pressure induced wavelength change in light emanating from the other end of the optical fiber waveguide by a pair of spaced apart photodetectors.

11. The method according to claim 3 further defined by measuring pressure induced wavelength change in light emanating from the other end of the optical fiber waveguide by a pair of spaced apart photodetectors.

* * * * *